US012130905B2

(12) United States Patent
Holm et al.

(10) Patent No.: US 12,130,905 B2
(45) Date of Patent: Oct. 29, 2024

(54) CONNECTED ACCESS CONTROL FOR MANAGED SERVICES

(71) Applicant: Carrier Corporation, Palm Beach Gardens, FL (US)

(72) Inventors: Ben Holm, Farmington, NY (US); Ed Gauthier, Fairport, NY (US); Randall Church, Wilmington, DE (US)

(73) Assignee: Carrier Corporation, Palm Beach Gardens, FL (US)

( * ) Notice: Subject to any disclaimer, the term of this patent is extended or adjusted under 35 U.S.C. 154(b) by 466 days.

(21) Appl. No.: 17/301,300

(22) Filed: Mar. 31, 2021

(65) Prior Publication Data

US 2021/0319092 A1    Oct. 14, 2021

Related U.S. Application Data

(60) Provisional application No. 63/017,052, filed on Apr. 29, 2020, provisional application No. 63/007,680, filed on Apr. 9, 2020.

(51) Int. Cl.
*G06F 21/00* (2013.01)
*G06F 16/21* (2019.01)
(Continued)

(52) U.S. Cl.
CPC .............. *G06F 21/45* (2013.01); *G06F 16/21* (2019.01); *G06F 21/44* (2013.01); *G06F 2221/2141* (2013.01)

(58) Field of Classification Search
CPC ........... G06F 16/21; G06F 21/44; G06F 21/45
See application file for complete search history.

(56) References Cited

U.S. PATENT DOCUMENTS 8,977,750 B2    3/2015    Ferris
8,984,589 B2    3/2015    Liu
(Continued)

FOREIGN PATENT DOCUMENTS

CN    102571821 A    7/2012
CN    104361469 A    2/2015
(Continued)

OTHER PUBLICATIONS

Extended European Search Report received for EP Application No. 21167460.1, mailed on Aug. 26, 2021, 08 Pages.

*Primary Examiner* — Rodman Alexander Mahmoudi
(74) *Attorney, Agent, or Firm* — Seager, Tufte & Wickhem, LLP

(57) ABSTRACT

A system and a method for providing managed services are provided. The system provides a first access control platform and a second access control platform. The first access control platform is configured to receive at least one of a hardware event, an access request event, and a management request event from at least one gateway (e.g., located at a premises). The first access control platform may include at least one of a permissions database (e.g., storing authorized access credentials), a hardware event database (e.g., storing hardware events), and a management database (e.g., storing management request events). The first access control platform may compare received access credentials to the authorized access credentials in the permissions database. The second access control platform may be configured to update at least one of the permissions database (e.g., adding/removing authorized access credentials) and the hardware event database (e.g., adding/removing security devices).

13 Claims, 3 Drawing Sheets

(51) Int. Cl.
*G06F 21/44* (2013.01)
*G06F 21/45* (2013.01)

(56) References Cited

U.S. PATENT DOCUMENTS

| | | | |
|---|---|---|---|
| 9,054,919 B2 | 6/2015 | Kiang et al. | |
| 9,167,050 B2 | 10/2015 | Durazzo et al. | |
| 9,235,442 B2 | 1/2016 | Kampas et al. | |
| 9,319,395 B2 | 4/2016 | Forster et al. | |
| 9,876,799 B2 | 1/2018 | Sowatskey | |
| 9,886,267 B2 | 2/2018 | Maheshwari et al. | |
| 9,948,552 B2 | 4/2018 | Teng et al. | |
| 9,965,339 B2 | 5/2018 | Bryan et al. | |
| 10,158,605 B2 | 12/2018 | White, Jr. et al. | |
| 10,243,875 B2 | 3/2019 | Mandaleeka et al. | |
| 10,425,386 B2 | 9/2019 | Wardell et al. | |
| 10,432,644 B2 | 10/2019 | Burns et al. | |
| 10,484,243 B2 | 11/2019 | Cole et al. | |
| 10,516,672 B2 | 12/2019 | Gupta et al. | |
| 10,559,193 B2 * | 2/2020 | Naidoo | G08B 13/19695 |
| 10,581,867 B2 | 3/2020 | Srinivasan et al. | |
| 11,398,147 B2 * | 7/2022 | Cohn | H04L 12/2825 |
| 2009/0165114 A1 * | 6/2009 | Baum | H04L 12/2809 |
| | | | 726/12 |
| 2013/0318231 A1 * | 11/2013 | Raji | H04L 67/55 |
| | | | 709/224 |
| 2015/0059003 A1 | 2/2015 | Bouse | |
| 2017/0126733 A1 * | 5/2017 | Mathew | H04L 63/1458 |
| 2017/0163644 A1 | 6/2017 | Horii | |
| 2017/0187705 A1 | 6/2017 | Shim et al. | |
| 2017/0236084 A1 | 8/2017 | Sullivan et al. | |
| 2018/0288045 A1 | 10/2018 | Karunakaran et al. | |
| 2019/0007411 A1 | 1/2019 | Braun et al. | |
| 2019/0303058 A1 | 10/2019 | Nuggehalli et al. | |

FOREIGN PATENT DOCUMENTS

| | | |
|---|---|---|
| CN | 105871914 A | 8/2016 |
| CN | 106993049 A | 7/2017 |
| CN | 107193546 A | 9/2017 |
| CN | 107707522 A | 2/2018 |
| CN | 108022034 A | 5/2018 |
| CN | 108243040 A | 7/2018 |
| CN | 109327553 A | 2/2019 |
| CN | 110012016 A | 7/2019 |
| EP | 2893685 B1 | 7/2017 |
| EP | 3375161 A1 | 9/2018 |
| EP | 3005764 B1 | 8/2019 |

* cited by examiner

CONNECTED ACCESS CONTROL FOR MANAGED SERVICES

CROSS REFERENCE TO A RELATED APPLICATION

The application claims the benefit of U.S. Provisional Application No. 63/007,680 filed Apr. 9, 2020 and U.S. Provisional Application No. 63/017,052 filed Apr. 29, 2020, the contents of which are hereby incorporated in their entirety.

BACKGROUND

Access control systems prevent unauthorized individuals from accessing protected areas. To access a protected area authorized access credentials must be presented to an access control device (e.g., a card reader).

Authorized credentials may be presented to the access control device using a number of different known technologies (e.g., RFID card, FOB, or mobile device). The decision of whether to grant access (e.g., by unlocking a door) is often times almost immediate. The decision is typically computed at a controller by checking a permissions database to ascertain whether there is a permission linked to the requester's access credential. If the permission is linked to the credential the access control system unlocks the door as requested, providing the requestor access.

In a standard access control platform the permissions database is maintained at a central server (e.g., which may be either on-site or cloud-based) and relevant parts of the permissions database are downloaded to individual controllers that control the locks at the doors. Maintaining the correct list of permissions for each cardholder is done through an administration process and can be complex, time consuming, and prone to errors. To manage such a system typically on-site security personnel are employed. These on-site security personnel often manage both the permissions database, as well as provide monitoring services (e.g., watching live video streams from on-site cameras). However, as a company scales, one location with one set of security personnel quickly becomes multiple locations, each with their own set of security personnel managing their respective access control systems. As can be expected, it can be very costly to a company to manage their access control systems.

To ease the management burden, access control platforms with management capabilities have been developed. These access control platforms are often managed by third parties (e.g., companies in the business of managing access control systems). These access control platforms offer a range of different services (e.g., video management, identity management, visitor access, surveillance, etc.), and are fully customizable to the needs of a company. However, the access control platforms with management capabilities can be very expensive to install (e.g., requiring robust on-site equipment) and may have services which, although impressive, may not currently be affordable to the small to medium sized companies. As such, commonly, small to medium sized companies often use access control platforms with limited capabilities that require on-site security personnel for management.

Accordingly, there remains a need for a system that provides managed services at a more affordable cost such that small to medium sized companies can avoid, or at least mitigate, the high costs typically associated with managing their access control systems.

BRIEF DESCRIPTION

According to one embodiment, a system for providing managed services is provided. The system includes a first access control platform and a second access control platform. The first access control platform is configured to receive at least one of a hardware event, an access request event, and a management request event from at least one gateway. The first access control platform includes at least one of a permissions database, a hardware event database, and a management database. The hardware event database is configured to store at least one hardware event. The permissions database is configured to store at least one authorized access credential. The management database is configured to store at least one management request event. The second access control platform is configured to receive at least one hardware event from the hardware event database and/or management request event from the management database.

In accordance with additional or alternative embodiments, the first access control platform is operable in a cloud computing network, and the second access control platform is operable in at least one of a cloud computing network and a local server system.

In accordance with additional or alternative embodiments, the gateway is configured at a premises.

In accordance with additional or alternative embodiments, the second access control platform is configured to process at least one hardware event.

In accordance with additional or alternative embodiments, the access request event includes an access credential.

In accordance with additional or alternative embodiments, the first access control platform is configured to compare the access credential to the authorized access credentials in the permissions database.

In accordance with additional or alternative embodiments, the management request event includes a request to add/remove at least one authorized access credential to/from the permissions database.

In accordance with additional or alternative embodiments, the second access control platform is configured to add/remove at least one access credential to/from the permissions database.

In accordance with additional or alternative embodiments, the management request event includes a request to add/remove at least one security device to/from the hardware event database.

In accordance with additional or alternative embodiments, the second access control platform is configured to add/remove at least one security device to/from the hardware event database.

According to another aspect of the disclosure, a method for providing managed services is provided. The method includes a step for subscribing a first premises and a second premises to a first access control platform. The first premises includes a first gateway. The second premises includes a second gateway. The method includes a step for subscribing a service provider to a second access control platform. The method includes a step for transmitting at least one hardware event from at least one of the first gateway and the second gateway to the first access control platform. The first access control platform includes a hardware event database configured to store at least one hardware event. The method includes a step for transmitting at least one hardware event from the first access control platform to the second access control platform. The second access control platform is configured to process at least one hardware event.

In accordance with additional or alternative embodiments, the method further includes a step for transmitting at least one management request event from at least one of the first gateway and the second gateway to the first access control platform, the first access control platform including a management database.

In accordance with additional or alternative embodiments, the method further includes a step for transmitting at least one management request event from the first access control platform to the second access control platform.

In accordance with additional or alternative embodiments, the management request event includes a request to add/remove at least one security device to/from the hardware event database, the second access control platform configured to add/remove at least one security device to/from the hardware event database.

In accordance with additional or alternative embodiments, the hardware events for the first premises and the second premises are independently processed by the second access control platform.

According to another aspect of the disclosure, a method for providing managed services is provided. The method includes a step for subscribing a first premises and a second premises to a first access control platform. The first premises includes a first gateway. The second premises includes a second gateway. The method includes a step for subscribing a service provider to a second access control platform. The method includes a step for transmitting at least one access request event including an access credential from at least one of the first gateway and the second gateway to the first access control platform. The first access control platform including a permissions database configured to store authorized access credentials. The first access control platform is configured to compare the access credential to the authorized access credentials.

In accordance with additional or alternative embodiments, the method further includes a step for transmitting at least one management request event from at least one of the first gateway and the second gateway to the first access control platform, the first access control platform including a management database.

In accordance with additional or alternative embodiments, the method further includes a step for transmitting at least one management request event from the first access control platform to the second access control platform.

In accordance with additional or alternative embodiments, the management request event includes a request to add/remove at least one authorized access credential to/from the permissions database, the second access control platform configured to add/remove at least one authorized access credential to/from the permissions database.

In accordance with additional or alternative embodiments, the authorized access credentials for the first premises and the second premises are independently updated through the second access control platform.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

Figure 1:
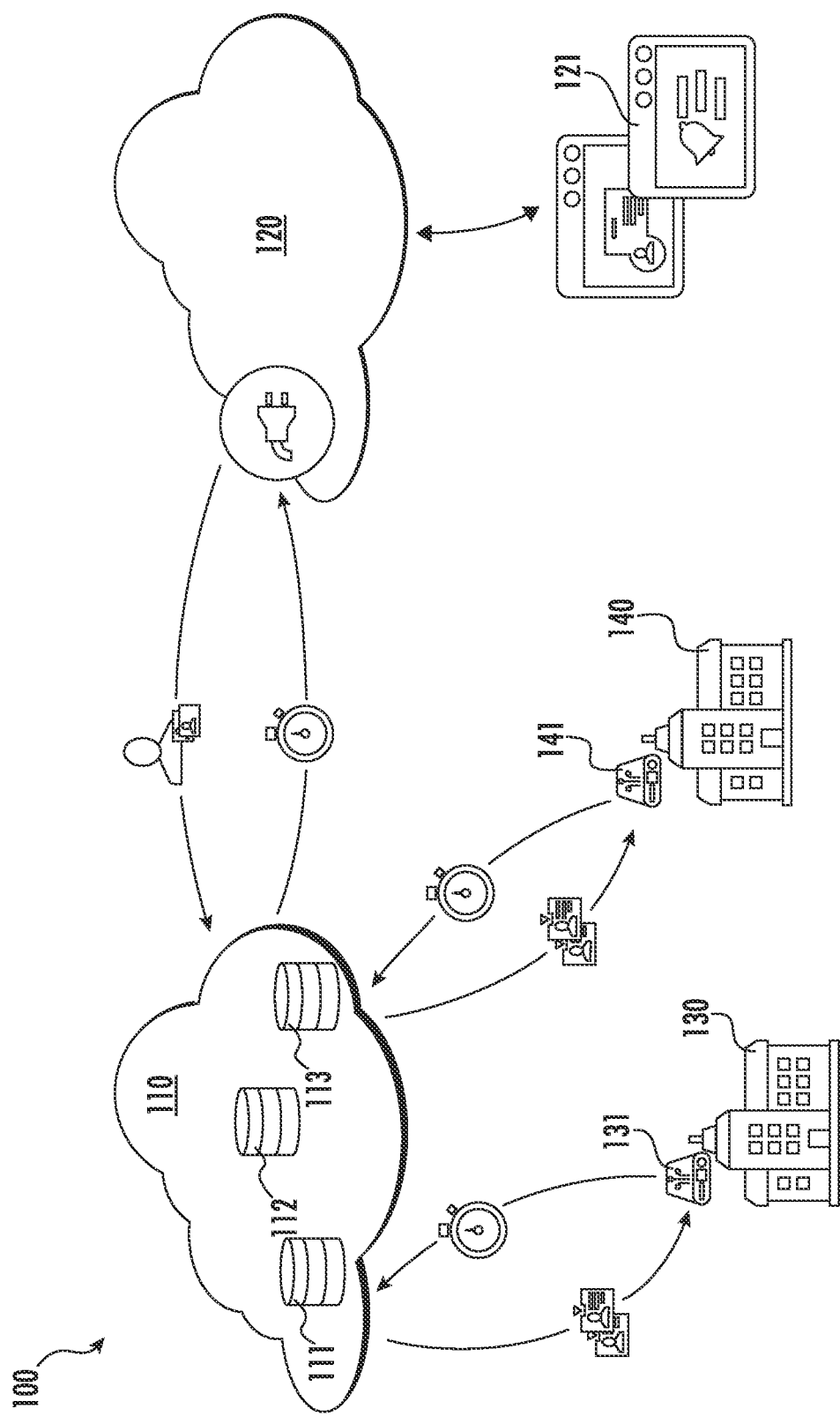
FIG. 1 is a schematic illustration of a system for providing managed services with a first access control platform and a second access control platform in accordance with one aspect of the disclosure.

A system and method for providing managed services are provided. The system makes it possible to provide managed services at a more affordable cost such that small to medium sized companies can avoid, or at least mitigate, the high costs typically associated with managing their access control systems. The system includes a first access control platform and a second access control platform. The first access control platform is configured to receive at least one of a hardware event, an access request event, and a management request event from at least one gateway. The first access control platform includes at least one of a permissions database, a hardware event database, and a management database. The hardware event database is configured to store at least one hardware event. The permissions database is configured to store authorized access credentials. The management database is configured to store at least one management request event. The second access control platform is configured to receive at least one hardware event from the hardware event database and/or management request event from the management database. The second access control platform may be configured to update the permissions database and/or the hardware event database (e.g., after receiving a management request event from the management database).

This system may enable a more affordable access control platform (e.g., the first access control platform) to be utilized by a single company at the company's satellite locations, while employing the more robust access control platform (e.g., the second access control platform) at the company's headquarters. This system makes it possible for a company to manage all the access control systems at all the various locations through one location (e.g., the headquarters). Instead of having to employ security personnel at multiple locations, through this system, a company may be able to have one centralized team of security personnel managing all locations.

In addition, this system may enable a third party service provider to provide managed services to multiple companies who, through existing systems, had to manage their own respective access control systems. For example, multiple different companies may utilize the affordable access control platform (e.g., the first access control platform) and a single third party services provider may manage (e.g., using the second access control platform) all the access control systems for each of the companies through one location (e.g., at the third party service provider's offices). This may make it possible for these companies to avoid personally managing their own access control systems.

It is envisioned that the first access control platform may include security devices installed at a local premises or building facility, and a cloud-based security system supported by a cloud computing network. The security devices may include, but are not limited to, card readers, video cameras, motion detectors, entryway locking mechanisms, hardware access panels, voice recognition devices, and various other biometric identification systems. A gateway, such as a router, for example, may be used to establish one or more signal communication between the cloud computing network and one or more devices (e.g., security devices, mobile devices, computing devices, mobile tablets, security cameras, etc.) located at the local premises. For example, one or more devices may operate one or more apps capable of exchanging data (e.g., access request event data and/or management request event data) with the cloud computing network (e.g., through the gateway). It is envisioned that the devices connected to the first access control platform may have limited control functions (e.g., locking/unlocking of particular entryways, global lockdown/unlock commands, etc.). For example, the adding or removing of authorized access credentials from the permissions database and the adding/removing of security devices connected to the hardware event database may only be possible through the second access control platform.

It is envisioned that the second access control platform may include one or more devices (e.g., computers, tablets, mobile devices). These devices may be installed at a local premises or building facility (e.g., of a third party service provider or headquarters of a company), and may be supported by a local server system (e.g., installed at the local premises or building facility). However, it is envisioned that the second access control system may be supported by a cloud computing network. For example, the devices may, in certain instances, be connected to a cloud computing network (e.g., using a gateway).

Regardless of how connected, the devices, through connection to the second access control platform, may be capable of providing service functions for the premises using the first access control platform. For example, the devices connected to the second access control platform may provide security monitoring functions (e.g., such as, monitoring and logging of locations where entry access is granted and/or denied, motion detection, unauthorized access breach, and monitoring of video cameras) for the premises which utilize the first access control platform. In addition, the devices connected to the second access control platform may provide management functions (e.g., such as, adding/removing authorized credentials from the permissions database of the first access control platform, and/or adding/removing security devices to/from connection with the hardware event database of the first access control platform).

It is envisioned that the management functions may be prompted by the transmission of a management request event from a device (e.g., a mobile device, computing device, or mobile tablet) connected to the first access control platform. For example, a request to add/remove authorized access credentials and/or security devices may be input into a mobile app or webpage using a device connected to the first access control platform. This management request event may be stored in a management database, which may transmit the management request event to the second access control platform where the management request event may be processed (e.g., by security personnel) using a device connected to the second access control platform.

With reference now to the Figures, an exemplary system 100 for providing managed services is shown in FIG. 1. FIG. 1 illustrates a first access control platform 110 and a second access control platform 120. The first access control platform 110 is configured to receive at least one of a hardware event (e.g., which may include data from security devices at a given premises 130, 140), an access request event (e.g., originating from an access control device, such as a card reader at a given premises 130, 140), and a management request event (e.g., originating from a mobile device, computing device, or mobile tablet connected to the first access control platform 110) from at least one gateway 131, 141. It should be appreciated that each premises 130, 140 (e.g., of a given company) may include multiple gateways 131, 141. However, for purposes of brevity and simplicity each premises 130, 140 has only been depicted with one gateway 131, 141. A gateway 131, 141 may be interpreted to be a piece of networking hardware (e.g., a router) that allows data (e.g., hardware events, access request events, and/or management request events) to flow across a network (e.g., from a given premises 130, 140 to the first access control platform 110).

The first access control platform 110 may include at least one of a permissions database 111, a hardware event database 112, and a management database 113. It should be appreciated that each of the permissions database 111, the hardware event database 112, and the management database 113 may respectively include computer readable storage medium (e.g., to store received data), which may include any of the following: a portable computer diskette, a hard disk, a random access memory (RAM), a read-only memory (ROM), an erasable programmable read-only memory (EPROM or Flash memory), a static random access memory (SRAM), a portable compact disc ready-only memory (CD-ROM), a digital versatile disk (DVD), a memory stick, a floppy disk, a mechanically encoded device such as punch-cards or raised structures in a groove having instructions recorded thereon, and any suitable combination of the foregoing. In certain instances, multiple databases (e.g., permissions database 111, the hardware event database 112, and/or the management database 113) may be utilize the same computer readable storage medium. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. It envisioned that the computer readable storage medium may be off-premises (e.g., located remotely from the premises 130, 140) and may be accessible through the cloud computing network of the first access control platform 110. Meaning that, in certain instances, the first access control platform 110 may be operable in a cloud computing network.

The computer readable storage medium may enable the storage of hardware events by the hardware event database 112, the storage and/or processing of access request events and authorized access credentials in the permissions database 112, and the storage and of management request events in the management database 113. In certain instances, an access request event includes an access credential. The first access control platform 110, in certain instances, is configured to compare the received access credential to the authorized access credentials stored in the permissions database 112. The second access control platform 120, in certain instance, is configured to manage (e.g., add or remove authorized access credentials) the permissions database 111 and/or manage (e.g. add or remove security devices) the hardware event database 112. For example, an administrator utilizing the second access control platform 120 may remove unused permissions, infrequently used permissions, or may reclassify permissions from the permissions database 111 for a given premises 130, 140. Additionally, an administrator utilizing the second access control platform 120 may add/remove security devices to/from the hardware event database 112 (e.g., enabling or disabling security devices from transferring hardware events to the hardware event database).

It is envisioned that through the second access control platform 120, dispatching of first responders to a particular premises 130, 140 may be possible. For example, when monitoring the hardware events from a premises 130, 140, the received data may indicate a threat that is either currently occurring or likely to soon occur at a given premises 130, 140. As such a first responders may be contacted (e.g., through any communication means) and dispatched to the particular premises 130, 140. This monitoring and dispatching of the first responders may be completed without requiring any involvement from the personnel at the particular premises 130, 140 where the hardware event originates.

Additionally, it is envisioned that this providing of managed services may be modified based on the particular needs of the premises 130, 140. For example, one premises 130, 140 may want off-site security monitoring capabilities (e.g., by a third party service provider) without having the off-site management of the permissions database. Additionally, one premises 130, 140 may want off-site management of the permissions database (e.g., by a third party service provider) without having the off-site security monitoring capabilities. It is envisioned that through this system 100 the particular needs of a given premises 130, 140 may be matched without requiring additional services.

Figure 2:
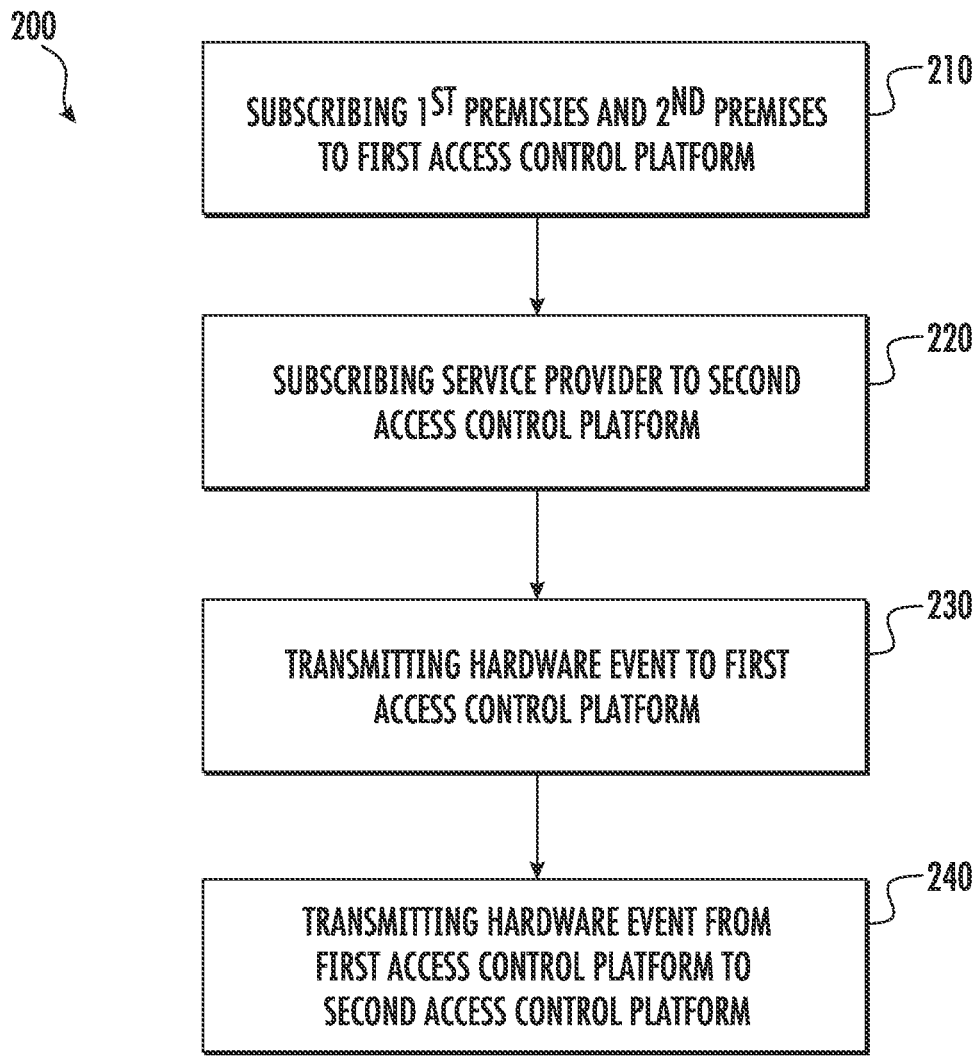
FIG. 2 is a flow diagram illustrating a first embodiment of a method for providing managed services in accordance with one aspect of the disclosure.

An exemplary method 200 of providing managed services (e.g., with off-site security monitoring) is illustrated in FIG. 2. This method 200 may be performed, for example, using the exemplary system 100 shown in FIG. 1, which includes a first access control platform 110 (e.g., connected to one or more premises 130, 140 through one or more gateway 131, 141), a second access control platform 120 (e.g., connected to the devices 121 operated by a services provider). The method 200 includes step 210 for subscribing a first premises 130 and a second premises 140 to a first access control platform 110. The first premises 130 including a first gateway 131 and the second premises 140 including a second gateway 141. The method 200 provides step 220 for subscribing a service provider (e.g., which may be interpreted to be the personnel located at the headquarters of a company, or the personnel employed by a third party) to a second access control platform 120. The method 200 provides step 230 for the transmitting of at least one hardware event from at least one of the first gateway 131 and the second gateway 141 to the first access control platform 110. The method 200 provides step 240 for transmitting at least one hardware event from the first access control platform 110 to the second access control platform 120. The second access control platform 120 configured to process at least one hardware event (e.g., through one or more microprocessor and/or through a person utilizing the second access control platform 120). As mentioned above, the processing of the hardware event may be used to determine whether to dispatch a first responder to the first premises 130 or the second premises 140. In certain instances, the hardware events for the first premises 130 and the second premises 140 are independently processed by the second access control platform 120. In certain instances, the first responder is dispatched only to the premises 130, 1140 having the gateway 131, 141 that transmitted the hardware event (e.g., containing the data indicating the need of a first responder).

Figure 3:
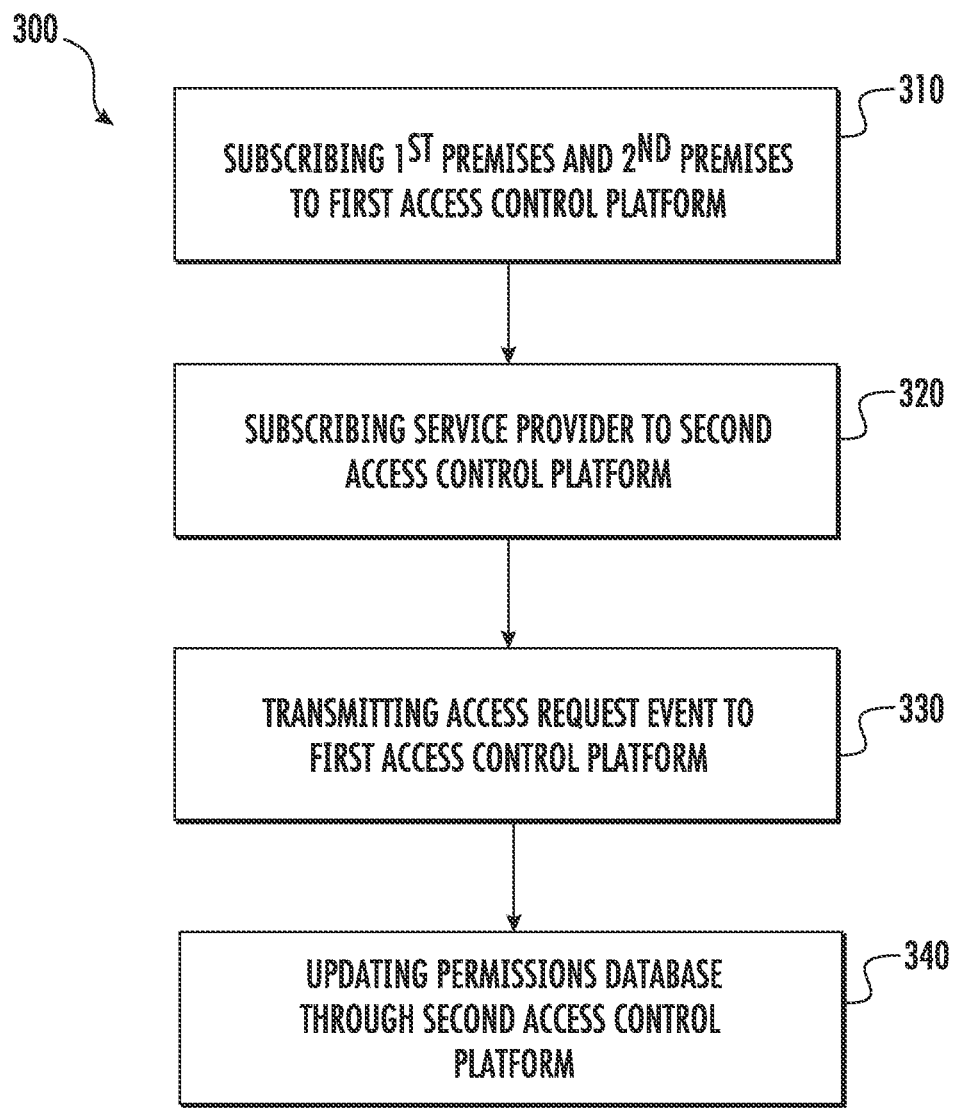
FIG. 3 is a flow diagram illustrating a second embodiment of a method for providing managed services in accordance with one aspect of the disclosure.

An exemplary method 300 of providing managed services (e.g., with off-site management of the permissions database) is illustrated in FIG. 3. This method 300 may be performed, for example, using the exemplary system 100 shown in FIG. 1, which includes a first access control platform 110 (e.g., connected to one or more premises 130, 140 through one or more gateway 131, 141), a second access control platform 120 (e.g., connected to the devices 121 operated by a services provider). The method 300 includes step 310 for subscribing a first premises 130 and a second premises 140 to a first access control platform 110. The first premises 130 including a first gateway 131 and the second premises 140 including a second gateway 141. The method 300 provides step 320 for subscribing a service provider (e.g., which may be interpreted to be the personnel located at the headquarters of a company, or the personnel employed by a third party) to a second access control platform 120. The method 300 provides step 330 for the transmitting of at least one access request event including an access credential from at least one of the first gateway 131 and the second gateway 141 to the first access control platform 110. The first access control platform 110 configured to compare the access credential to the authorized access credentials stored in the permissions database 112. The method 300 may provide a step 340 for updating the permissions database 112 by adding or removing at least one access credential from the permissions database 112 through the second access control platform 120. As mentioned above, this updating of the permissions database 112 may be prompted by the transmission of a management request event from the management database 113 of the first access control platform 110 to the second access control platform 120. It is envisioned that the authorized credentials for the first premises 130 and the second premises 140 may be independently updated through the second access control platform 120.

The use of the terms "a" and "and" and "the" and similar referents, in the context of describing the invention, are to be construed to cover both the singular and the plural, unless otherwise indicated herein or cleared contradicted by context. The use of any and all example, or exemplary language (e.g., "such as", "e.g.", "for example", etc.) provided herein is intended merely to better illuminate the invention and does not pose a limitation on the scope of the invention unless otherwise claimed. No language in the specification should be construed as indicating any non-claimed elements as essential to the practice of the invention.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for providing managed services, the system comprising:
  a first access control platform configured to receive at least one of a hardware event at a given premises, an access request event at the given premises, and a management request event from at least one gateway, the first access control platform comprising at least one of a permissions database, a hardware event database, and a management database, the hardware event database configured to store at least one hardware event, the permissions database configured to store at least one authorized access credential, the management database configured to store at least one management request event; and a second access control platform configured to receive at least one hardware event from the hardware event database and/or management request event from the management database, wherein
the management request event comprises a request to add/remove at least one or more authorized access credential to access the premises to/from the permissions database,
the second access control platform is configured to add/remove at least one or more access credential to access the premises to/from the permission database; and
the authorized access credential for the first premises and the second premises are independently added/removed through the second access control platform.

2. The system for providing managed services of claim 1, wherein the first access control platform is operable in a cloud computing network, and the second access control platform is operable in at least one of a cloud computing network and a local server system.

3. The system for providing managed services of claim 1, wherein the gateway is configured at a premises.

4. The system for providing managed services of claim 1, wherein the second access control platform is configured to process at least one hardware event.

5. The system for providing managed services of claim 1, wherein the access request event comprises an access credential.

6. The system for providing managed services of claim 5, wherein the first access control platform is configured to compare the access credential to the authorized access credentials in the permissions database.

7. The system for providing managed services of claim 1, wherein the management request event comprises a request to add/remove at least one security device to/from the hardware event database.

8. The system for providing managed services of claim 1, wherein the second access control platform is configured to add/remove at least one security device to/from the hardware event database.

9. A method for providing managed services, the method comprising:
subscribing a first premises and a second premises to a first access control platform, the first premises comprising a first gateway, the second premises comprising a second gateway;
subscribing a service provider to a second access control platform;
transmitting at least one hardware event from at least one of the first gateway and the second gateway to the first access control platform, the first access control platform comprising a hardware event database configured to store at least one hardware event; and
transmitting at least one hardware event from the first access control platform to the second access control platform, the second access control platform configured to process at least one hardware event,
transmitting at least one management request event from at least one of the first gateway and the second gateway to the first access control platform, the first access control platform comprising a management database and a permissions database;
transmitting at least one management request event from the first access control platform to the second access control platform, the management request event comprises a request to add/remove at least one or more authorized access credential to access the first or second premises to/from the permissions database, and
the second access control platform is configured to add/remove at least one or more access credential to access the first or second premises to/from the permission database; and
the authorized access credential for the first premises and the second premises are independently added/removed through the second access control platform.

10. The method for providing managed services of claim 9, wherein the management request event comprises a request to add/remove at least one security device to/from the hardware event database, the second access control platform configured to add/remove at least one security device to/from the hardware event database.

11. The method for providing managed services of claim 9, wherein the hardware events for the first premises and the second premises are independently processed by the second access control platform.

12. A method for providing managed services, the method comprising:
subscribing a first premises and a second premises to a first access control platform, the first premises comprising a first gateway, the second premises comprising a second gateway;
subscribing a service provider to a second access control platform;
transmitting at least one access request event comprising an access credential for the first or the second premises from at least one of the first gateway and the second gateway to the first access control platform, the first access control platform comprising a permissions database configured to store authorized access credentials to the first and second premises, the first access control platform configured to compare the access credential to the authorized access credentials
transmitting at least one management request event from at least one of the first gateway and the second gateway to the first access control platform, the first access control platform comprising a management database; and
transmitting at least one management request event from the first access control platform to the second access control platform; wherein the management request event comprises a request to add/remove at least one authorized access credential to the first or second premises to/from the permissions database, the second access control platform configured to add/remove at least one authorized access credential to the first or second premises to/from the permissions database.

13. The method for providing managed services of claim 12, wherein the authorized access credentials for the first premises and the second premises are independently added/removed through the second access control platform.

* * * * *